United States Patent
Cho

(10) Patent No.: US 10,727,527 B2
(45) Date of Patent: Jul. 28, 2020

(54) ELECTRODE ASSEMBLY

(71) Applicant: Samsung SDI Co., Ltd., Yongin-si, Gyeonggi-do (KR)

(72) Inventor: Gi-Bong Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 441 days.

(21) Appl. No.: 15/494,095

(22) Filed: Apr. 21, 2017

(65) Prior Publication Data
US 2017/0317375 A1    Nov. 2, 2017

(30) Foreign Application Priority Data

May 2, 2016 (KR) .......... 10-2016-0054018

(51) Int. Cl.
*H01M 10/04* (2006.01)
*H01M 2/18* (2006.01)
(Continued)

(52) U.S. Cl.
CPC ..... *H01M 10/0431* (2013.01); *H01M 2/1673* (2013.01); *H01M 2/18* (2013.01);
(Continued)

(58) Field of Classification Search
CPC ......... H01M 10/0431; H01M 10/0525; H01M 10/0583; H01M 10/0459; H01M 10/0472;
(Continued)

(56) References Cited

U.S. PATENT DOCUMENTS

| 6,423,449 B1 | 7/2002 | Hong |
| 2003/0013012 A1 | 1/2003 | Ahn et al. |

(Continued)

FOREIGN PATENT DOCUMENTS

| JP | 56-24065 | 3/1981 |
| JP | 60-97547 | 5/1985 |

(Continued)

OTHER PUBLICATIONS

EPO Extended Search Report dated Sep. 14, 2017, for corresponding European Patent Application No. 17168364.2 (9 pages).

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

An electrode assembly includes: a plurality of first electrodes, each including a first electrode portion having a first active material layer thereon and a first uncoated region electrically connected to the first electrode portion; a separation membrane including a plurality of receiving portions arranged at intervals and respectively accommodating the first electrode portions, the separation membrane being folded so that surfaces of adjacent ones of the receiving portions face each other; and a plurality of second electrodes respectively positioned between adjacent ones of the receiving portions that face each other to overlap a corresponding one of the first electrode portions. The plurality of second electrodes each include a second electrode portion having a second active material layer thereon and a second uncoated region electrically connected to the second electrode portion.

17 Claims, 30 Drawing Sheets

(51) Int. Cl.
  *H01M 2/16* (2006.01)
  *H01M 10/42* (2006.01)
  *H01M 10/0583* (2010.01)
  *H01M 10/0525* (2010.01)
  *H01M 2/14* (2006.01)
  *H01M 2/02* (2006.01)
  *H01M 4/13* (2010.01)

(52) U.S. Cl.
  CPC ... *H01M 10/0459* (2013.01); *H01M 10/0472* (2013.01); *H01M 2/02* (2013.01); *H01M 2/14* (2013.01); *H01M 4/13* (2013.01); *H01M 10/0525* (2013.01); *H01M 10/0583* (2013.01); *H01M 2010/4292* (2013.01)

(58) Field of Classification Search
  CPC ....... H01M 2010/4292; H01M 2/1673; H01M 2/18; H01M 2/14; H01M 4/02; H01M 4/13
  See application file for complete search history.

(56) References Cited

U.S. PATENT DOCUMENTS

| | | | |
|---|---|---|---|
| 2004/0048150 A1* | 3/2004 | Crouch, Jr. | H01M 2/1673 429/142 |
| 2006/0099496 A1* | 5/2006 | Aamodt | H01M 2/18 429/136 |
| 2011/0052964 A1 | 3/2011 | Kim et al. | |
| 2011/0135996 A1 | 6/2011 | Ahn et al. | |
| 2013/0133184 A1 | 5/2013 | Bacci et al. | |
| 2013/0236767 A1 | 9/2013 | Nishikawa et al. | |
| 2014/0377631 A1 | 12/2014 | Park et al. | |
| 2015/0024245 A1 | 1/2015 | Kwon et al. | |
| 2015/0162638 A1 | 6/2015 | Bernini et al. | |
| 2016/0276713 A1* | 9/2016 | Maeyoshi | H01M 2/18 |

FOREIGN PATENT DOCUMENTS

| | | | |
|---|---|---|---|
| JP | 4737817 | | 5/2002 |
| JP | 2009-289418 | | 12/2009 |
| JP | 2015-53224 | A | 3/2015 |
| KR | 2001-0000061 | | 1/2001 |
| KR | 2001-0082058 | | 8/2001 |
| KR | 10-0365824 | | 12/2002 |
| KR | 10-2007-0047857 | | 5/2007 |
| KR | 10-2008-0036250 | | 4/2008 |
| KR | 10-2009-0064021 | | 6/2009 |
| KR | 10-2011-0035635 | | 4/2011 |
| KR | 10-2011-0063899 | | 6/2011 |
| KR | 10-2012-0069977 | | 6/2012 |
| KR | 10-2012-0082580 | | 7/2012 |
| KR | 10-1189621 | | 10/2012 |
| KR | 10-2012-0131269 | | 12/2012 |
| KR | 10-2013-0124922 | | 11/2013 |
| KR | 10-2015-0021069 | | 2/2015 |
| KR | 10-2015-0059576 | | 6/2015 |
| KR | 10-2015-0062738 | | 6/2015 |
| KR | 1020150062738 | * | 6/2015 |
| WO | WO 2014/017864 | A1 | 1/2014 |
| WO | WO 2015/045796 | A1 | 4/2015 |
| WO | WO2015045796 | * | 4/2015 |

* cited by examiner

ELECTRODE ASSEMBLY

CROSS-REFERENCE TO RELATED APPLICATION

This application claims priority to and the benefit of Korean Patent Application No. 10-2016-0054018, filed in the Korean Intellectual Property Office on May 2, 2016, the entire content of which is incorporated herein by reference.

BACKGROUND

1. Field

Aspects of embodiments of the present invention relate to an electrode assembly.

2. Description of the Related Art

A rechargeable battery is a power storage system (e.g., a power storage device) that stores energy by converting electrical energy into chemical energy and stores it with excellent energy density. Unlike a primary battery that is not designed to be recharged, the rechargeable battery is designed to be recharged, such that it is widely used in information technology (IT) devices, such as smartphones, cellular phones, laptop computers, tablet computers, and the like.

Recently, interest in electric cars has been increasing due to problems, such as environment degradation and fossil fuel depletion, and the rechargeable battery is often used as a battery for electric vehicles.

According to such a trend, the rechargeable battery should have certain characteristics, such as high density, high power, safety, etc.

A lead-acid battery, a nickel-cadmium battery, a nickel hydrogen battery, a lithium ion battery, a lithium polymer battery, a lithium metal battery, a lithium air battery, a sodium air battery, etc., are different types of rechargeable batteries. A rechargeable battery using lithium (e.g., the lithium ion battery) has a higher operating voltage and greater energy density per unit weight than other types of rechargeable batteries, such that it is increasingly applied to portable IT devices and electric vehicles.

When a short circuit occurs in the lithium ion battery, combustion and explosion may occur due to strong reactivity of the lithium in the lithium-based rechargeable battery. Accordingly, electrode assemblies are generally configured to have a safe structure in which a short circuit between electrodes may not occur even though charging/discharging are repeatedly performed. An electrode assembly structure of the rechargeable battery which may ensure safety and which may be rapidly manufactured is being developed.

Of known electrode assemblies, first, there is a spiral-wound electrode assembly structure in which positive and negative electrodes with a membrane therebetween are rolled, and second, there is a stack type electrode assembly structure in which positive and negative electrodes cut to a size of the battery are alternately stacked with separation membranes therebetween.

However, the spiral-wound type electrode assembly may be deformed due to expansion of the negative electrode during charging/discharging. And, although the stack type electrode assembly may be more structurally stable than (e.g., may be deformed less than) the spiral-wound type electrode assembly, when the separation membrane shrinks due to heat generated during charging/discharging, or when the battery is deformed due to an external impact, a short circuit between the positive and negative electrodes may easily occur.

For example, when the stack type electrode assembly, which is manufactured through a laminating process of heating and attaching the electrodes to the separation membrane, an electrolyte solution slowly permeates into a surface of the electrodes and a wetted state thereof is nonuniform. Thus, capacity of the rechargeable battery may be nonuniform and a lifespan thereof may be shortened.

The above information disclosed in this Background section is for enhancement of understanding of the background of the present invention and it may contain information that is not prior art.

SUMMARY

Aspects of embodiments of the present invention provide an electrode assembly for a rechargeable battery having a lengthened lifespan by allowing an electrolyte solution of the rechargeable battery to be uniformly permeated.

Aspects of embodiments of the present invention also provide an electrode assembly for a rechargeable battery that may reduce or minimize deformation occurring while the rechargeable battery is charged or discharged and that may reduce or minimize occurrence of a short circuit due to shrinkage of a separation membrane or an impact.

An exemplary embodiment of the present invention provides an electrode assembly including: a plurality of first electrodes, each including a first electrode portion having a first active material layer thereon and a first uncoated region electrically connected to the first electrode portion; a separation membrane including a plurality of receiving portions arranged at intervals and respectively accommodating the first electrode portions, the separation membrane being folded so that surfaces of adjacent ones of the receiving portions face each other; and a plurality of second electrodes respectively positioned between adjacent ones of the receiving portions that face each other to overlap a corresponding one of the first electrode portions. The plurality of second electrodes each includes a second electrode portion having a second active material layer thereon and a second uncoated region electrically connected to the second electrode portion.

The separation membrane may further include a first bonding portion at an edge of one of the receiving portions and sealing one side of the receiving portion. The first uncoated region of the first electrode accommodated in the one of the receiving portions may extend through the first bonding portion to protrude outside of the receiving portion.

The separation membrane may further include a plurality of second bonding portions. The second bonding portions may be respectively connected to opposite ends of the first bonding portion. The second bonding portions may be at opposite edges of the one of the receiving portions and extend in a direction crossing the first bonding portion.

The separation membrane may further include a third bonding portion extending in a direction parallel to the first bonding portion, and the first bonding portion and the third bonding portion may be at opposite edges of the one of the first electrode portions accommodated in the one receiving portion.

At least one of the first bonding portion and the third bonding portion may be formed in plural.

The first bonding portion, the second bonding portions, and the third bonding portion may surround a periphery of the one of the first electrode portions.

The second electrode portions may each include an extended electrode portion protruding outside of a periphery of the first electrode portion, and the extended electrode portion may have a notch that is concave toward the first electrode portion.

One surface of the extended electrode portion may be bonded to the second bonding portion.

The second bonding portion may have a cutout corresponding to the notch.

The separation membrane may further include a fourth bonding portion between adjacent ones of the receiving portions.

The separation membrane may further include a fifth bonding portion at an edge of one of the receiving portions overlapping the first uncoated region.

The separation membrane may further include a sixth bonding portion extending in a direction parallel to the fifth bonding portion, and the fifth bonding portion and the sixth bonding portion may be positioned at opposite sides of one of the first electrode portions in the one of the receiving portions.

At least one of the fourth bonding portion, the fifth bonding portion, and the sixth bonding portion may be formed in plural.

The fourth bonding portion, the fifth bonding portion, and the sixth bonding portion may surround a periphery of one of the first electrode portions in the one of the receiving portions.

The first electrodes and the second electrodes may be alternately stacked.

At least three edges of the receiving portions may be closed.

The separation membrane may include a first member and a second member that respectively overlap opposite surfaces of the first electrode portions with the first electrode portions therebetween, and the first member and the second member may be bonded to each other along a periphery of each of the first electrode portions.

The first electrode may be a positive electrode, and the second electrode may be a negative electrode.

The second electrode portions may be larger than the first electrode portions.

According to another embodiment of the present invention, an electrode assembly includes: a plurality of first electrodes, each including a first electrode portion having a first active material layer thereon and a first uncoated region electrically connected to the first electrode portion; a plurality of second electrodes, each including a second electrode portion having a second active material layer and a second uncoated region electrically connected to the second electrode portion; a first member including first portions respectively overlapping top surfaces of ones of the first electrode portions arranged at intervals and second portions between adjacent ones of the first portions; and a second member including a third portion respectively overlapping bottom surfaces of the first electrode portions and fourth portions between adjacent ones of the third portions, the second portions of the first member and the fourth portions being bonded to each other at first bonding portions. The fourth portion is folded in a direction facing one surface of the first member or a direction facing one surface of the second member, and the second electrode is between the facing first members or the facing second members.

The second member may extend from the first member and may be folded to cover one side of the first electrode portions.

The first electrodes and the second electrodes may be alternately stacked with the first member or the second member therebetween.

The first portion and the third portion may respectively include a first extended portion and a second extended portion that are extended outside of a periphery of the first electrode portions. The first extended portions may respectively overlap the first uncoated regions and the second uncoated regions, and the second extended portions may be at opposite sides of the first electrode portions.

The first uncoated regions and the second uncoated regions may respectively protrude outside of the first extended portions.

The first extended portion of the first portion and the first extended portion of the third portion may be bonded to each other at second bonding portions.

The second extended portion of the first portion and the second extended portion of the third portion may be bonded to each other at third bonding portions.

The first bonding portion, the second bonding portion, and third bonding portion may surround a periphery of one of the first electrode portions.

The first bonding portion, the second bonding portion, and the third bonding portion may be formed in plural.

The second electrode portion may include an extended electrode portion protruding outside of a periphery of the first electrode portion, and the extended electrode portion may include a notch that is concave toward the periphery of the first electrode portion.

The extended electrode portion may be bonded to the first member and/or the second member at the first bonding portion.

The separation membrane may have a cutout at the first bonding portion corresponding to the notch.

The first electrode may be a positive electrode, and the second electrode may be a negative electrode.

The second electrode portions may be larger than the first electrodes.

According to exemplary embodiments of the present invention, it is possible to increase capacity of a rechargeable battery without increasing a size of an electrode assembly by alternately stacking positive and negative electrodes and a separation membrane.

According to exemplary embodiments of the present invention, by wrapping and fixing a positive electrode with a separation membrane and then manufacturing a rechargeable battery, even if the separation membrane tends to shrink due to repeated charging and discharging processes, it is possible to prevent the positive and negative electrodes from directly contacting each other to cause a short circuit, thereby improving safety of the rechargeable battery.

In addition, according to exemplary embodiments of the present invention, it is possible to reduce time for aligning electrodes of different polarities while repeatedly folding one fixed electrode, thereby improving productivity and manufacturing time of the rechargeable battery.

Further, according to exemplary embodiments of the present invention, an electrolyte solution may easily and uniformly reach a surface of an electrode by positioning and fixing the electrode without heating and fusion-bonding a surface of the electrode and a surface of a separation membrane, thereby improving the quality of the rechargeable battery.

DETAILED DESCRIPTION

Figure 1:
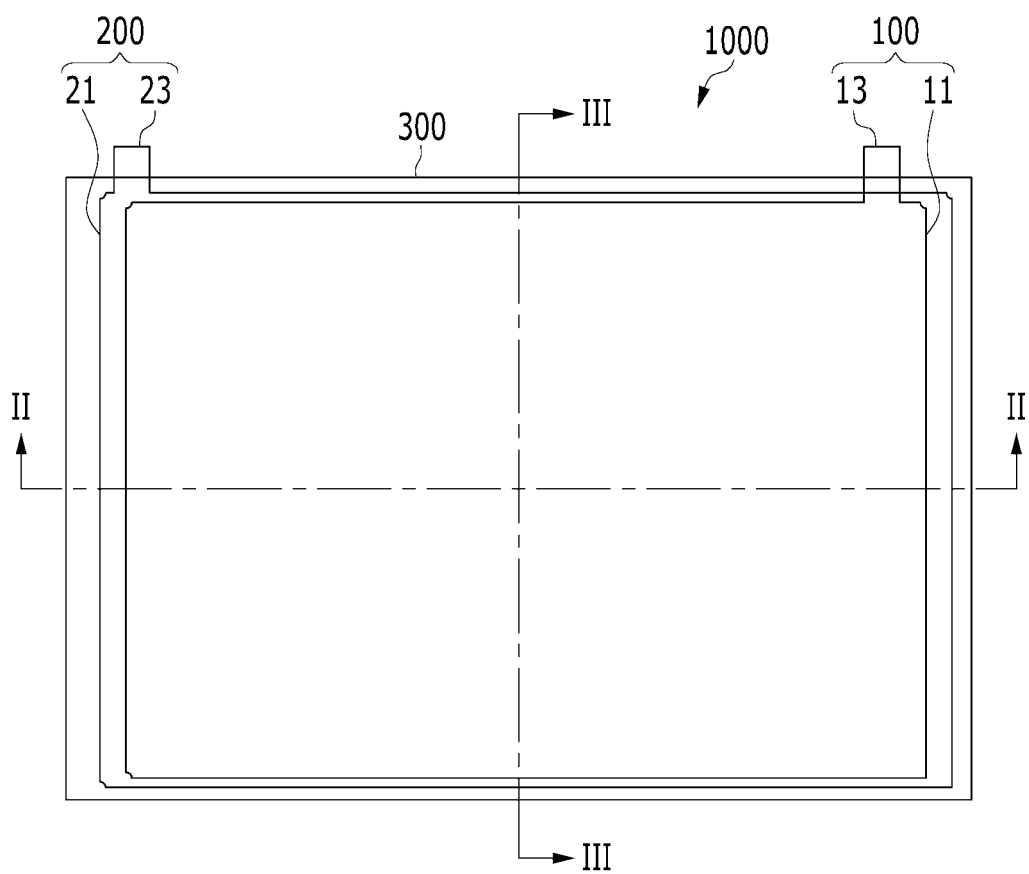
FIG. 1 is a top view of an electrode assembly for a rechargeable battery according to an exemplary embodiment of the present invention.

The present invention will be described more fully hereinafter with reference to the accompanying drawings, in which exemplary embodiments of the present invention are shown. As those skilled in the art would realize, the described embodiments may be modified in various different ways, all without departing from the spirit or scope of the present disclosure.

To clearly describe aspects and features of the present invention, portions which are not necessary for one skilled in the art to have a complete understanding of the present invention may be omitted, and like reference numerals designate like elements throughout the specification.

Further, the size and thickness of each component shown in the drawings may be arbitrarily shown for better understanding and ease of description, and the present disclosure is not limited to the illustrated sizes and thicknesses. For example, in the drawings, the thickness of layers, films, panels, regions, etc., may be exaggerated for clarity.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, electrode assemblies of a rechargeable battery according to exemplary embodiments of the present invention will be described, in detail, with reference to the accompanying drawings.

Figure 2:
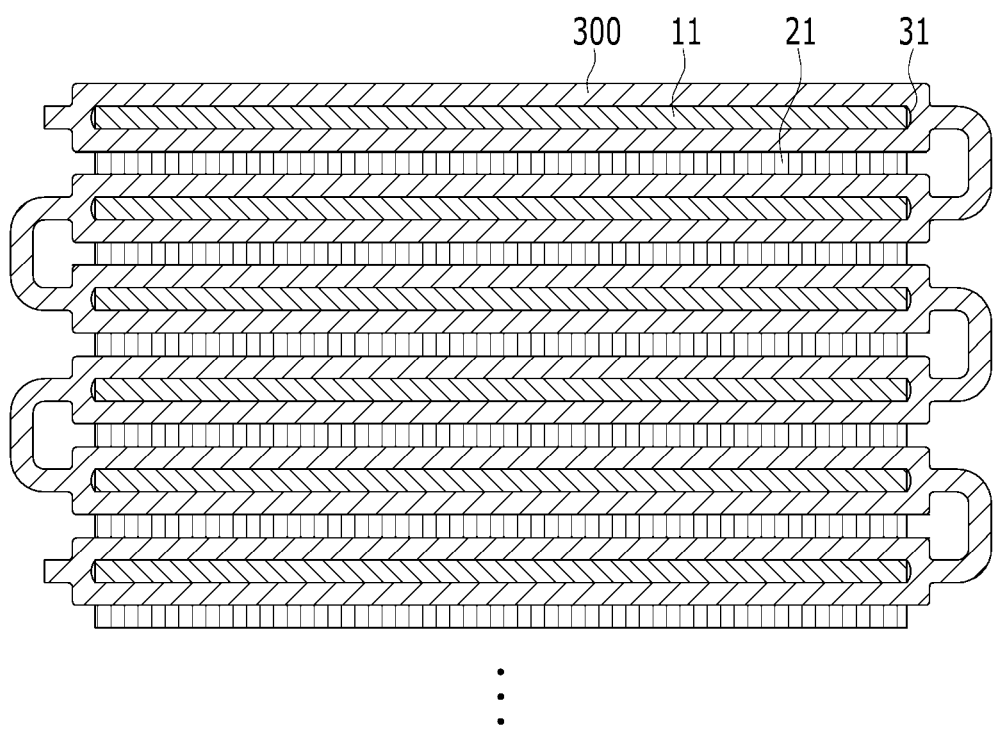
FIG. 2 is a cross-sectional view taken along the line II-II of FIG. 1.
Figure 3:
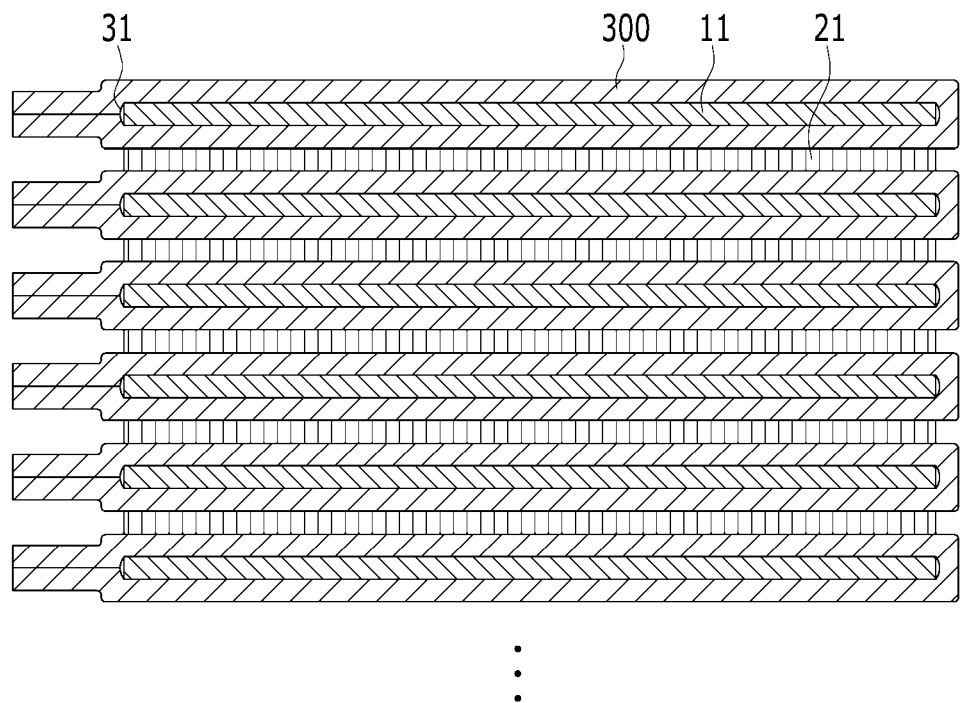
FIG. 3 is a cross-sectional view taken along the line III-III of FIG. 1.
Figure 4:
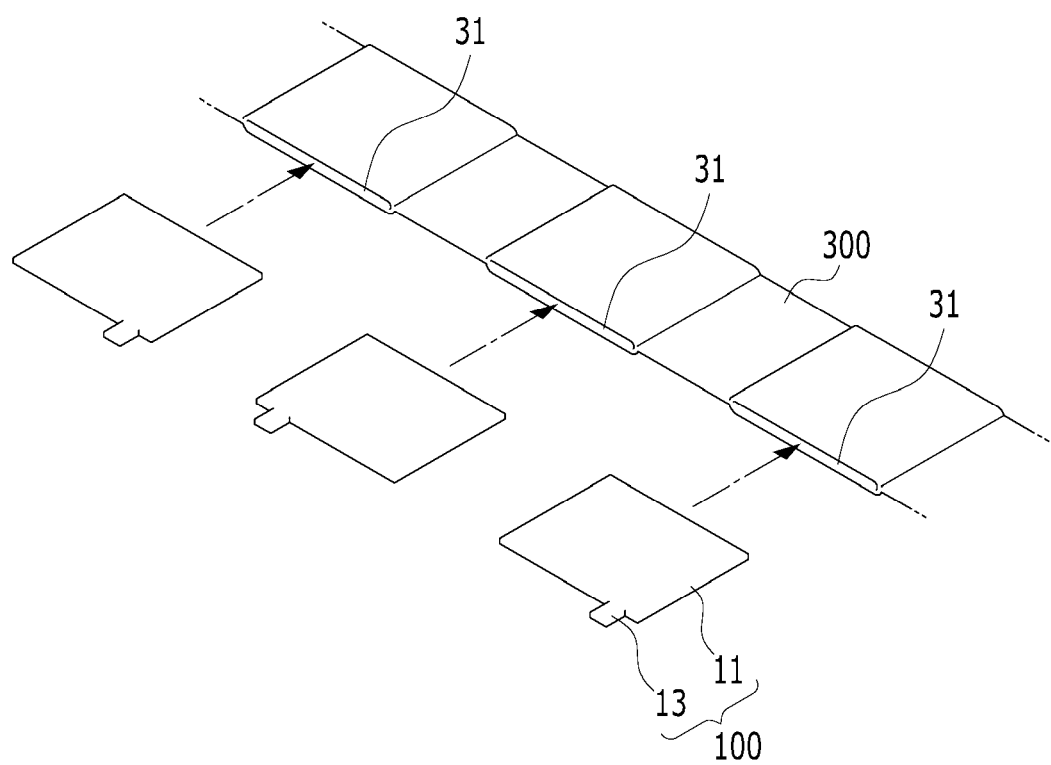
FIG. 4 is a perspective view of a separation membrane of the electrode assembly shown in FIG. 1.

FIG. 1 is a top view of an electrode assembly of a rechargeable battery according to an exemplary embodiment of the present invention, FIG. 2 is a cross-sectional view taken along the line II-II of FIG. 1, FIG. 3 is a cross-sectional view taken along the line III-III of FIG. 1, and FIG. 4 is a perspective view of a separation membrane of the electrode assembly shown in FIG. 1.

As shown in FIGS. 1-3, an electrode assembly 1000 according to an exemplary embodiment of the present invention includes a first electrode 100 and a second electrode 200 that face each other and a separation membrane 300 positioned therebetween. The electrode assembly 1000 includes a plurality of the first electrodes 100 and a plurality of the second electrodes 200, and the first electrodes 100 and the second electrodes 200 are stacked with the separation membrane 300 therewith (e.g., the separation membrane 300 is between each adjacent pair of the first and second electrodes 100 and 200).

The first electrode 100 includes a first electrode portion 11 and a first uncoated region 13. The first electrode 100 may be connected to a positive electrode of the rechargeable battery through the first uncoated region 13.

The first electrode portion 11 includes a first substrate and a first active material layer disposed on the first substrate. The first active material layer may be disposed at opposite surfaces of the first substrate but is not limited thereto. For example, in some embodiments, the first active material layer may be disposed at only one surface of the first substrate.

The first substrate is (or serves as) a metal thin layer that provides a moving passage of charges generated in the first active material layer and supports the first active material layer. For example, the first electrode portion 11 may be connected to the positive electrode of the rechargeable battery (e.g., the first electrode portion 11 may be connected to the positive electrode of the rechargeable battery via the first uncoated region 13), and the first substrate may include aluminum or an aluminum alloy.

The first active material layer may be formed by mixing various suitable materials for an electrode including, for example, an electrode active material, a binder, a conductor, etc. in a solvent to make a slurry, coating the slurry on at least one surface of the first substrate, and then drying and compressing the first substrate to form the first active material layer thereon.

The first uncoated region 13 may be integrated with (e.g., integral with) the first substrate and may protrude from one side of the first substrate. The first uncoated regions 13 of the plurality of the first electrodes 100 may be provided along one side (e.g., the same side) of the first electrode portions 11 thereof.

The second electrode 200 includes a second electrode portion 21 and a second uncoated region 23 and may be connected to a negative electrode of the rechargeable battery.

The second electrode portion 21 includes a second substrate and a second active material layer disposed on the second substrate. The second active material layer may be disposed at opposite surfaces of the second substrate but is not limited thereto. In some embodiments, the second active material layer may be disposed at only one surface of the second substrate.

The second substrate is a metal thin layer that provides a moving passage of charges generated in the second active material layer and supports the second active material layer. For example, the second electrode 200 may be connected to the negative electrode of the rechargeable battery (e.g., the second electrode 200 may be connected to the negative electrode of the rechargeable battery via the second uncoated region 23), and the second substrate may include copper or a copper alloy.

The second active material layer may be formed by mixing suitable materials for an electrode including, for example, an electrode active material, a binder, a conductor, etc. in a solvent to make a slurry, coating the slurry on at least one surface of the second substrate, and then drying and compressing the second substrate to form the second active material layer thereon.

The second uncoated region 23 may be integrated with (e.g., integral with) the second substrate and may protrude from one side of the second substrate. At least one of first uncoated regions 13 may be provided at one side of the second electrode portion 21. The second uncoated region 23 is spaced from (e.g., spaced apart from) the first uncoated region 13 so that they are not short-circuited to each other.

The separation membrane 300 may be a porous film having high ion permeability and mechanical strength. For example, the separation membrane 300 may be made of an olefin-based polymer, such as polyethylene, polypropylene, etc.

Referring to FIG. 4, the first electrodes 100 are arranged along a length direction of the separation membrane 300 at intervals (e.g., at predetermined intervals), and the separation membrane 300 may include receiving portions 31 in which the first electrode portions 11 are received or accommodated. The separation membrane 300 may include a single sheet member or a pair of sheet members.

A size of the receiving portion 31 may be greater than that of the first electrode portion 11 so that the receiving portion 31 may wholly or entirely surround the first electrode portion 11. One side of the receiving portion 31 is open so that the first electrode portion 11 may be inserted into the receiving portion 31 therethrough.

A bonding portion may be disposed at an edge of the receiving portion 31. This will be further described below with reference to the accompanying drawings.

Figure 5:
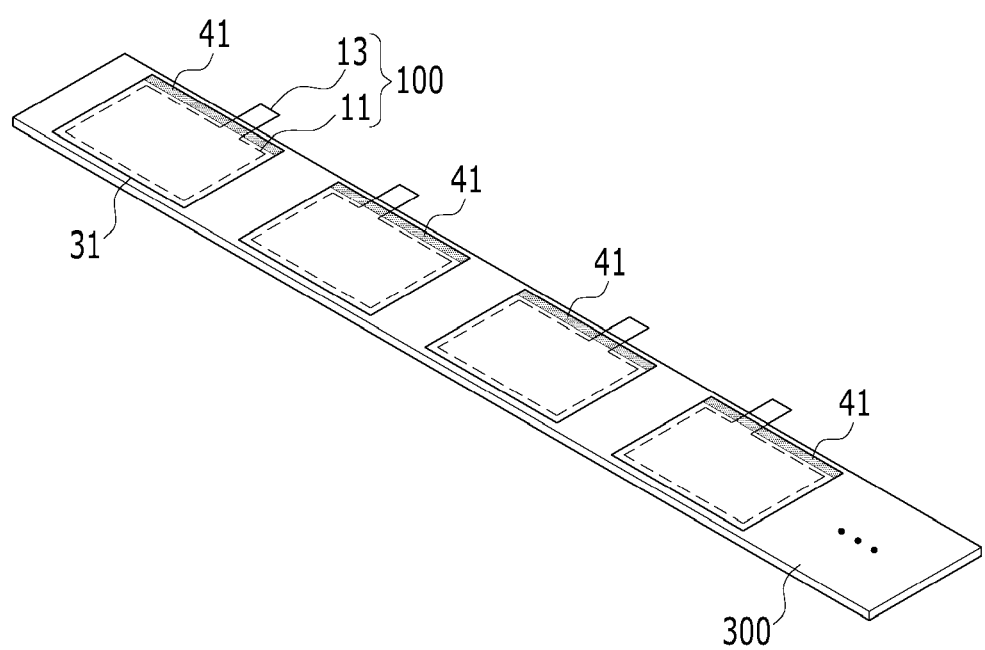
FIGS. 5-7 illustrate separation membranes including a first electrode according to other exemplary embodiments of the present invention.
Figure 6:
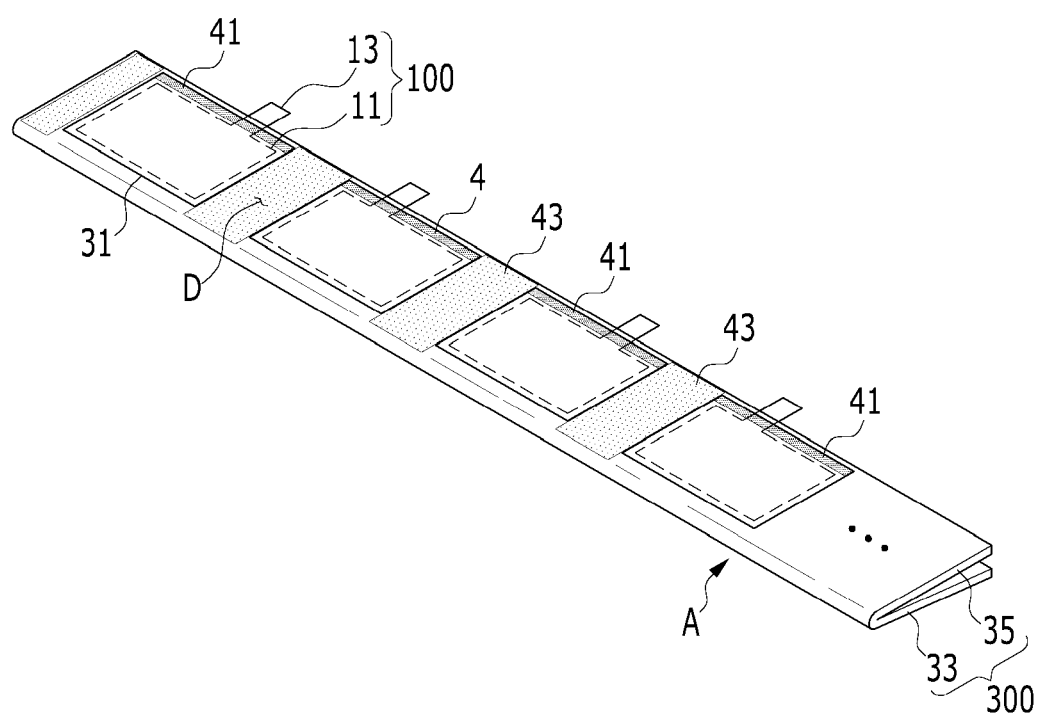
Figure 7:
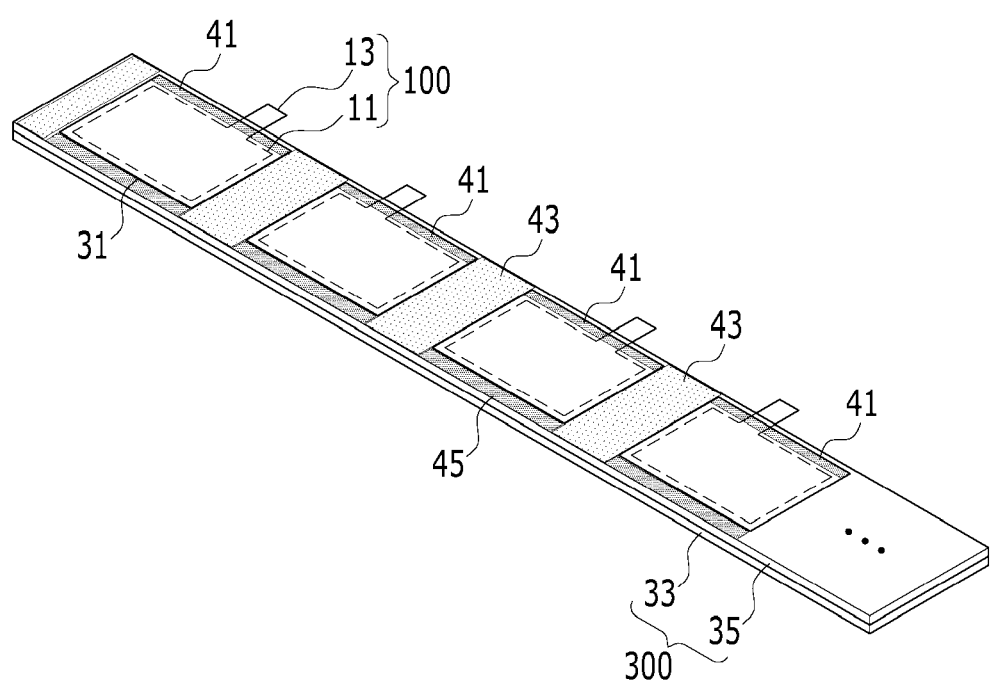

FIGS. 5-7 illustrate separation membranes and first electrodes according to exemplary embodiments of the present invention.

As shown in FIG. 5, a first bonding portion 41 may be provided at the edge of the receiving portion 31. For example, the first bonding portion 41 is positioned at an edge of the open side of the receiving portion 31 and may be a thermal-bonded, friction-welded, or adhesive-bonded portion.

The first bonding portion 41 may be bonded in a state in which the first electrode portion 11 is inserted into the receiving portion 31, and when the first bonding portion 41 is bonded, the first electrode portion 11 may be sealed in the receiving portion 31. In this case, the first uncoated region 13 crosses (e.g., extends through) the first bonding portion 41 and protrudes outside of the receiving portion 31, and the first bonding portion 41 overlapping the first uncoated region 13 is respectively bonded to opposite surfaces of the first uncoated region 13 (e.g., the separation membrane 300 is bonded to opposite surfaces of the first uncoated region 13 at the first bonding portion 41).

As shown in FIG. 5, when the separation membrane 300 is formed as one sheet member and is a pocket-type separation membrane (e.g., when the receiving portion 31 is a pocket in the separation membrane 300), in which only one side of the receiving portion 31 is open, the first electrode portion 11 may be sealed by only the first bonding portion 41. However, the present invention is not limited thereto, and in other embodiments, another bonding portion may be provided at another side (or edge) of the receiving portion 31 that is not open. When the bonding portion is provided at another side of the receiving portion 31 that is not open, the separation membrane 300 becomes closely attached to (e.g., in close contact with) the first electrode portion 11 due to shrinking, thereby further stably fixing the first electrode portion 11 in the receiving portion 31.

As shown in FIG. 6, the separation membrane 300 according to another embodiment may further include second bonding portions 43. A pair of the second bonding portions 43 are positioned at the edges of the receiving portion 31 (e.g., a second bonding portion 43 may be provided at opposite sides of the receiving portion 31), may be respectively connected to opposite end portions of the first bonding portion 41, and may extend in a direction crossing the first bonding portion 41. For example, the second bonding portion 43 is disposed in a region (D) between two adjacent receiving portions 31, and the two adjacent receiving portions 31 may share (e.g., may both contact) the second bonding portion 43.

As shown in FIG. 6, a separation membrane 300 according to another embodiment includes a first member 33 and a second member 35 (e.g., a first layer and a second layer or a first sheet and a second sheet) positioned on opposite surfaces of the first electrode portion 11. The first member 33 and the second member 35 may be integrally formed. When the first and second members 33 and 35 are integrally formed, one of the sheet members is folded along a folding line (A) while interposing the first electrode portion 11 between the first and second sheet members 33 and 35 such that the first member 33 and the second member 35 may be respectively disposed to face opposite surfaces of the first electrode portion 11.

As such, when the integral sheet members 33 and 35 are folded, because the folded portion is not open as shown in FIG. 6, the first electrode portion 11 may be sealed in the receiving portion 31 by forming (e.g., by only forming) the first bonding portion 41 and the second bonding portion 43. Further, as shown in FIG. 6, it is possible to further stably fix the first electrode portion 11 by forming another bonding portion at an edge of the sheet member that is not open (e.g., by forming another bonding portion at where the first and second sheet members 33 and 35 meet).

As shown in FIG. 7, a separation membrane 300 according to another embodiment may include a third bonding portion 45. The third bonding portion 45 may be positioned at an opposite side of the first electrode portion 11 as the first bonding portion 41. In such an embodiment, respective ends of the first bonding portion 41, the second bonding portion 43, and the third bonding portion 45 may be connected to each other to surround a border (or a periphery) of the first electrode portion 11.

The separation membrane 300 shown in FIG. 7 includes the first member 33 and the second member 35 that are respectively positioned on the opposite surfaces of the first electrode portion 11. In this embodiment, the first member 33 and the second member 35 are separate.

When the first member 33 and the second member 35 are separate, because all edges around the first electrode portion 11 are open, the first electrode portion 11 may be sealed in the receiving portion 31 by forming the first bonding portion 41, the second bonding portion 43, and the third bonding portion 45.

As in the exemplary embodiments described above, when the first bonding portion 41, the second bonding portion 43, and the third bonding portion 45 are formed, the first electrode portion 11 may be sealed in the receiving portion 31.

In other embodiments, when the second bonding portion 43 is formed together with the first bonding portion 41 or when the second bonding portion 43 and the third bonding portion 45 are formed together with the first bonding portion 41, it is possible to further stably fix the first electrode portion 11 in the receiving portion 31. For example, when the bonding portion(s) is formed by thermal-bonding and the like, the receiving portion 31 shrinks due to the applied heat, and the first bonding portion 41, the second bonding portion 43, and the third bonding portion 45 may be adjacent to or may closely contact the first electrode portion 11. Accordingly, a space (e.g., an excess space) in the receiving portion 31 for the first electrode portion 11 decreases, thereby fixing the first electrode portion 11 in the receiving portion 31. As such, when the first electrode portion 11 is fixed in the receiving portion 31, a process for aligning the first electrode portion 11 and the second electrode portion 21 may be easily performed during the manufacturing process of the electrode assembly.

Figure 8:
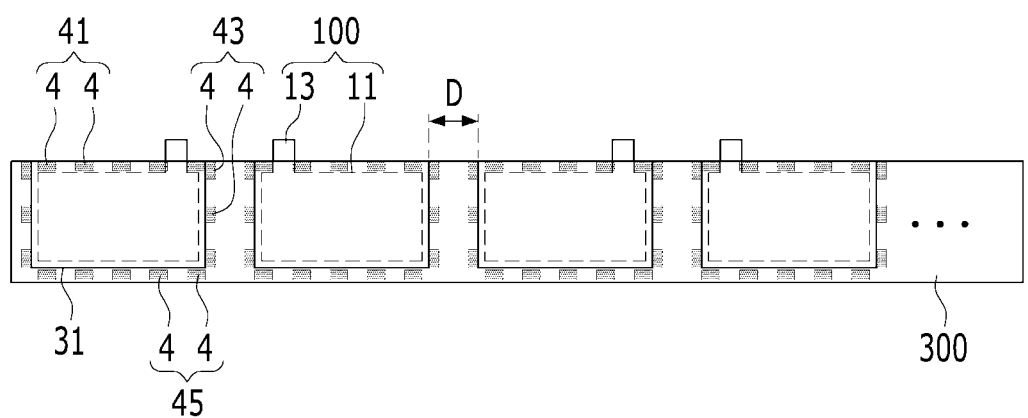
FIGS. 8-16 illustrate separation membranes including a first electrode according to other exemplary embodiments of the present invention.

In the exemplary embodiments described above, it is exemplarily described that the first electrode portion 11 is sealed in the receiving portion 31 by forming the first bonding portion 41, the second bonding portion 43, and/or the third bonding portion 45 such that they connect to one another, but the present invention is not limited thereto. For example, as shown in FIG. 8, to be further described later, at least one of the first bonding portion 41, the second bonding portion 43, and the third bonding portion 45 may each include a plurality of small bonding portions.

Referring back to FIGS. 2 and 3, the separation membrane 300 may be repeatedly folded so that surfaces of the adjacent receiving portions 31 face each other, resulting in the separation membrane 300 having a structure in which a plurality of receiving portions 31 are stacked. For example, the separation membrane 300 may be folded in a zigzag form or shape. Accordingly, the first electrode portions 11 respectively inserted into the receiving portion 31 are also repeatedly stacked.

The second electrodes 200 are positioned between the receiving portions 31 in which the first electrodes 100 are accommodated, and the first electrode portion 11 and the second electrode portion 21 are disposed to correspond to each other. According to embodiments of the present invention, in the state in which the first electrode portion 11 is received in the receiving portion 31, when the second electrode 200 is disposed between surfaces of the receiving portions 31 that are folded to face each other, the first electrode 100, the separation membrane 300, and the second electrode 200 may be alternately stacked.

In the exemplary embodiments described above, it is described that the first electrode portion 11 is sealed in the receiving portion 31 by forming the first bonding portion 41, the second bonding portion 43, and/or the third bonding portion 45, but the present invention is not limited thereto. For example, as shown in FIGS. 8-11, a plurality of small bonding portions may be included.

FIGS. 8-16 illustrate separation membranes including a first electrode according to other exemplary embodiments of the present invention.

Because the first electrode 100 and the separation membrane 300 shown in FIGS. 8-16 are substantially similar to or the same as the first electrode 100 and the separation membrane 300 shown in FIGS. 1-7, aspects, features, and/or parts that are different between these embodiments will be described in detail.

Figure 9:
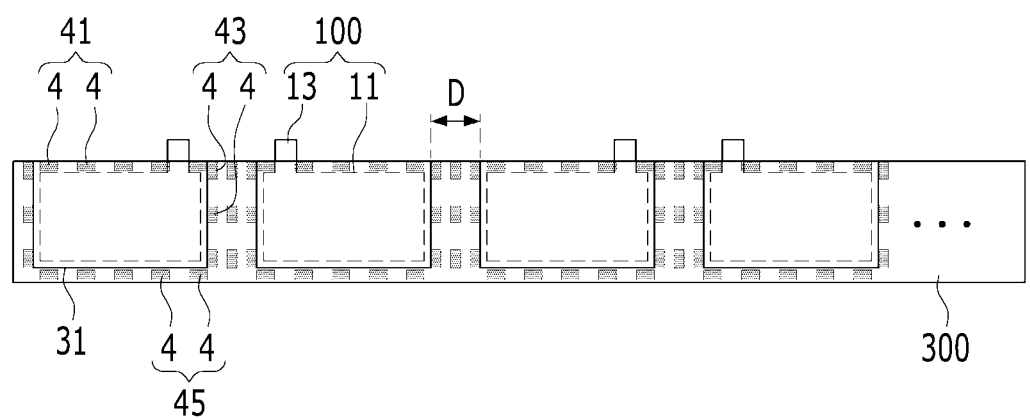
Figure 10:
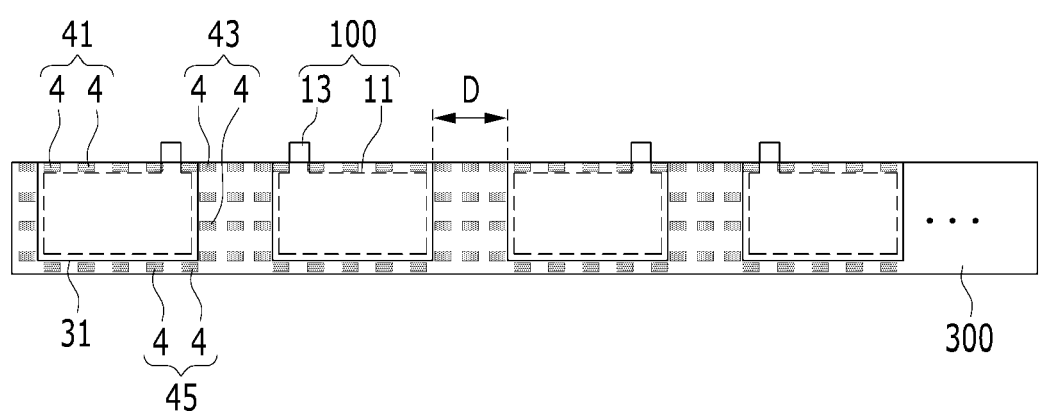

As shown in FIGS. 8-10, the separation membrane 300 includes the first bonding portion 41, the second bonding portion 43, and the third bonding portion 45 that surround (e.g., that surround a periphery of) the first electrode portion 11, and each of the bonding portions 41, 43, and 45 includes a plurality of small bonding portions 4. The plurality of small bonding portions 4 may be disposed at intervals (e.g., at predetermined intervals). As shown in FIGS. 8-10, the plurality of small bonding portions 4 may be disposed along the border (or the periphery) of the first electrode portion 11 or may be variously disposed in the region (D) between the adjacent receiving portions 31. The small bonding portions 4 may be disposed in a matrix form. Each of the bonding portions 4 may be formed to have various suitable shapes according to a thickness and elasticity of the separation membrane 300 and a size of the region (D) between two receiving portions 31 adjacent to each other.

As such, when a plurality of first bonding portions 41, a plurality of second bonding portions 43, and a plurality of third bonding portions 45 are formed, it is possible to stably fix the first electrode portion 11 and to easily move the electrolyte.

In the exemplary embodiments shown in FIGS. 5-7, the second bonding portion 43 is positioned between two of the receiving portions 31 adjacent to each other and the two receiving portion 31 share one second bonding portion 43, but the present invention is not limited thereto.

Figure 11:
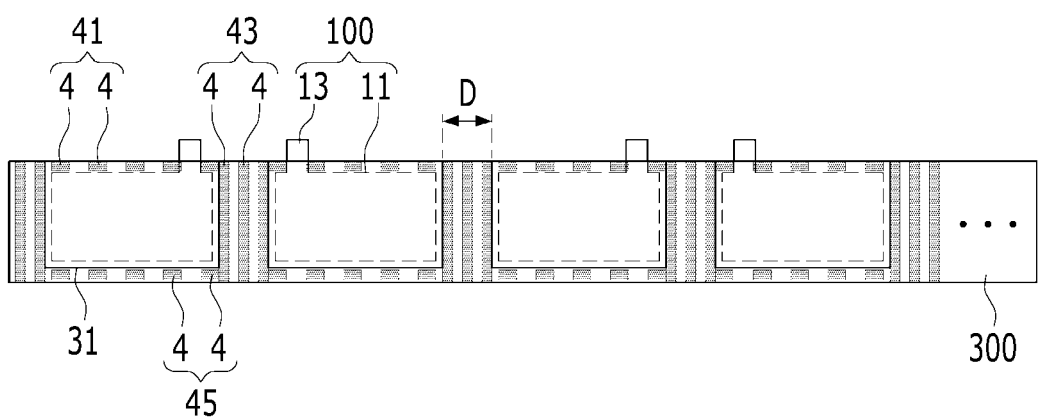

As shown in FIG. 11, the second bonding portion 43 may be disposed at each of the edges of the two receiving portions 31 adjacent to each other. In such an embodiment, when the separation membrane 300 includes the first member 33 and the second member 35, the first member 33 and the second member 35 positioned in the region (D) between the adjacent second bonding portions 43 may be separate (e.g., the first member 33 and the second member 35 in the region (D) between the adjacent second bonding portions 43 may not be completely bonded together).

When the first member 33 and the second member 35 are included and one second bonding portion 43 is disposed in the region (D) between the adjacent receiving portions 31 (refer to, for example, FIGS. 5-7), the first and second members 33 and 35 may not be easily folded because the thickness at the region (D) is increased. In addition, when a fusion-bonding defect occurs, the first member 33 and the second member 35 may be separated (e.g., may not be sufficiently bonded).

However, as shown in FIG. 11, when the second bonding portion 43 is disposed at each of the receiving portions 31, the folded thickness does not increase because the first member 33 and the second member 35 positioned in the region (D) between the adjacent second bonding portions 43 are separated (e.g., the first member 33 and the second member 35 are not bonded together or are not completely bonded together). Thus, bending stress may be applied to each of them to be easily folded. In addition, because a plurality of the second bonding portions 43 are disposed in the region (D) between two adjacent receiving portions 31, even when a fusion-bonding defect occurs at any of (e.g., at any one of) the second bonding portions 43, the first member 33 and the second member 35 are not separated (e.g., the first member 33 and the second member 35 are suitably bonded together).

Further, as shown in FIG. 11, when a plurality of the second bonding portions 43 are disposed at intervals (e.g., at predetermined intervals) in the region (D) between two adjacent ones of the receiving portions 31, the separation membrane 300 may be easily folded because an area at where the separation membrane 300 folds is guided.

Figure 12:
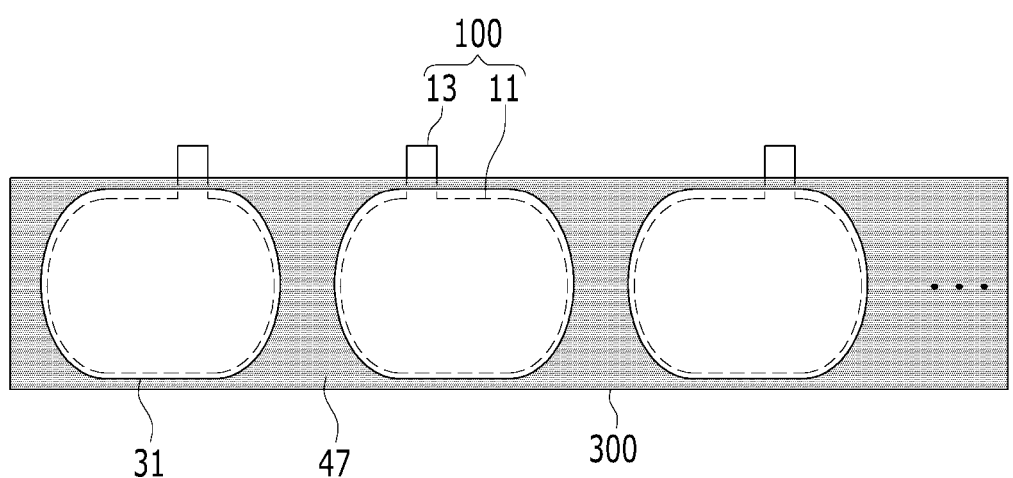
Figure 13:
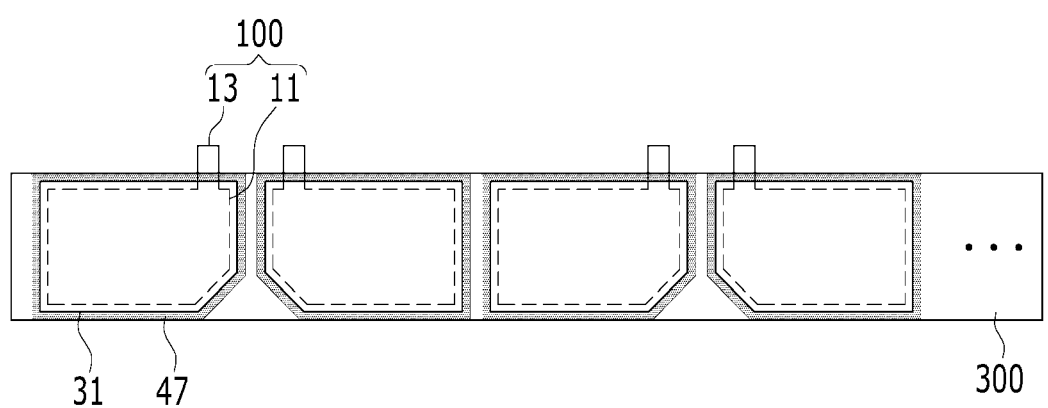
Figure 14:
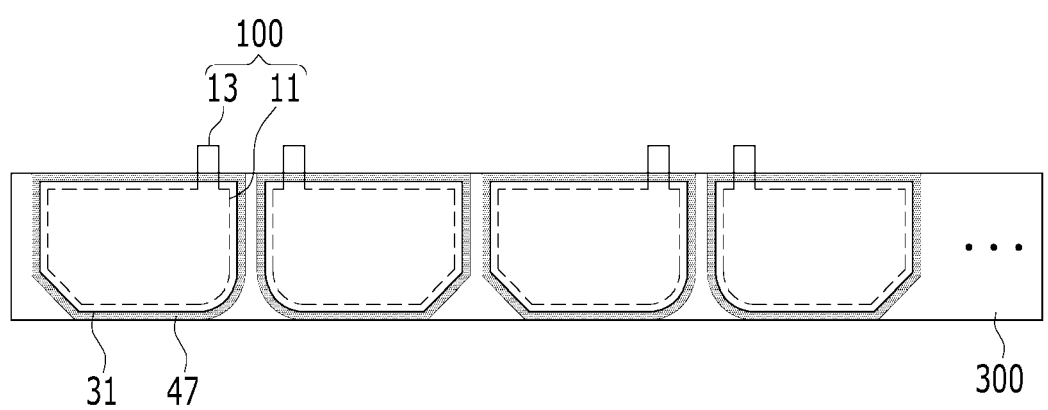
Figure 15:
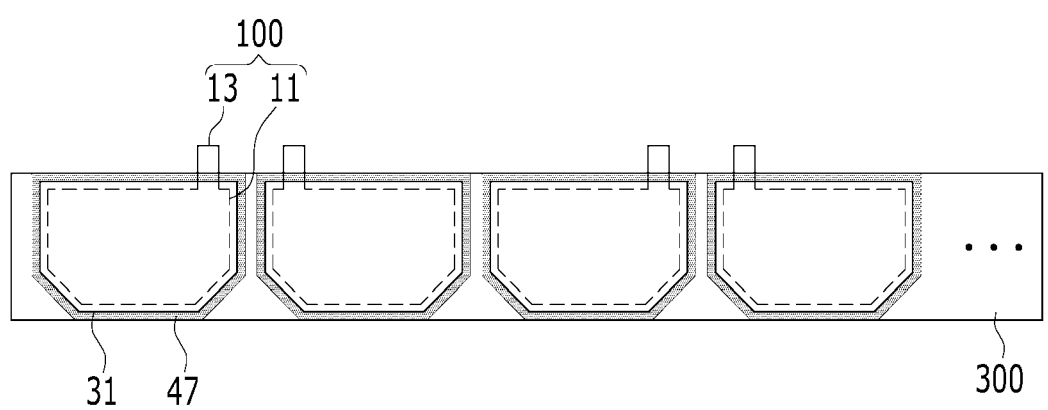
Figure 16:
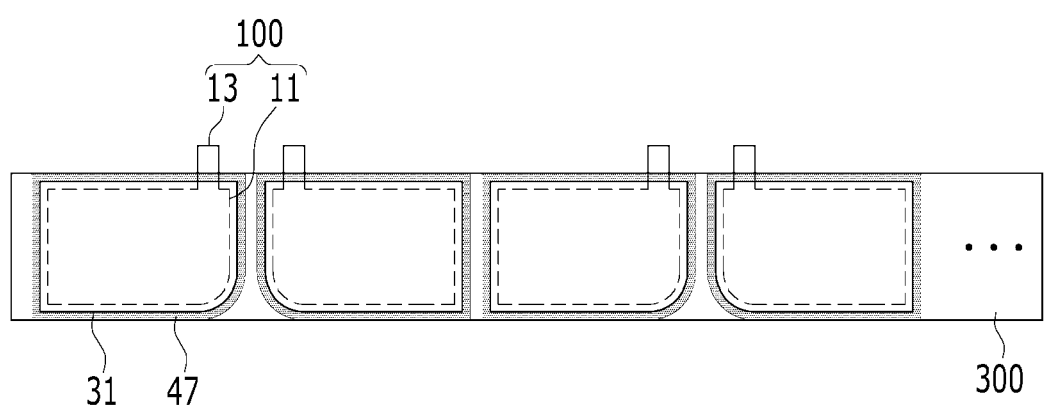

In the exemplary embodiments described above, the first electrode portion 11 is shown as being substantially quadrangular, but the present invention is not limited thereto. In some embodiments, the electrode portions may have other various shapes. For example, the first electrode portion 11 may be substantially circular as shown in FIG. 12 or may have at least one corner that is chamfered as shown in FIGS. 13-16 to be stably fixed. In the embodiment shown in FIG. 12, a bonding portion 47 may be formed in all regions between the first electrode portions 11. In the embodiments shown in FIGS. 13-16, the bonding portion 47 may be formed to have a linear shape along a border (or a periphery) of the first electrode portions 11. As described above, the bonding portion 47 may be formed to have (or may be formed of) a plurality of small bonding portions.

FIGS. 17-20 illustrate separation membranes including a first electrode and a second electrode according to other exemplary embodiments of the present invention.

Figure 17:
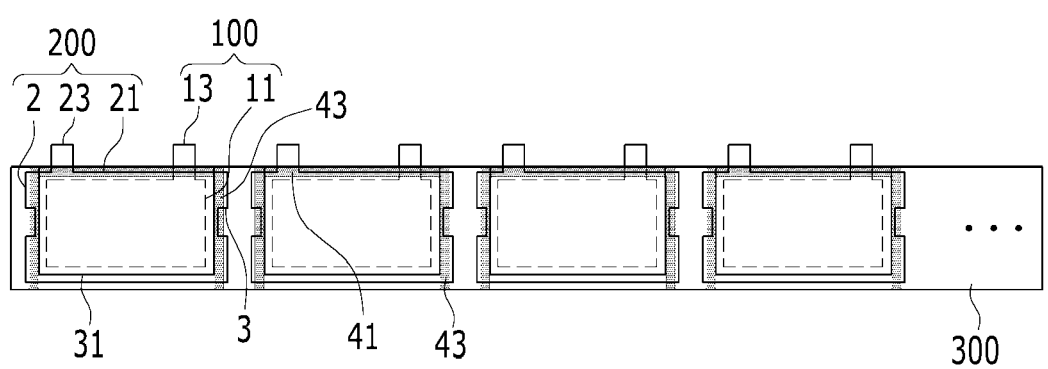
FIGS. 17-20 illustrate separation membranes, a first electrode, and a second electrode according to other exemplary embodiments of the present invention.

As shown in FIG. 17, the first electrode 100 is fixed in the receiving portion 31 provided in the separation membrane 300, and the first electrode portion 11 overlaps the second electrode portion 21.

The second electrode portion 21 may include an extended electrode portion 2 protruding outside of a border (or a periphery) of the first electrode portion 11 (e.g., outside of a periphery of the adjacent, stacked first electrode portion 11). The extended electrode portion 2 may have a notch 3 that is concave toward the border of the first electrode portion 11. In some exemplary embodiments of the present invention, when the extended electrode portion 2 has the notch 3, an area at where the second bonding portion 43 and the extended electrode portion 2 contact each other is increased by the area of the notch 3. Accordingly, when the second bonding portion 43 is thermal-bonded, the first electrode portion 11 may be further tightly fixed to the separation membrane 300 because the second bonding portion 43 surrounds a greater area (e.g., a greater peripheral area) of the second electrode portion 21 while the second bonding portion 43 shrinks.

Figure 18:
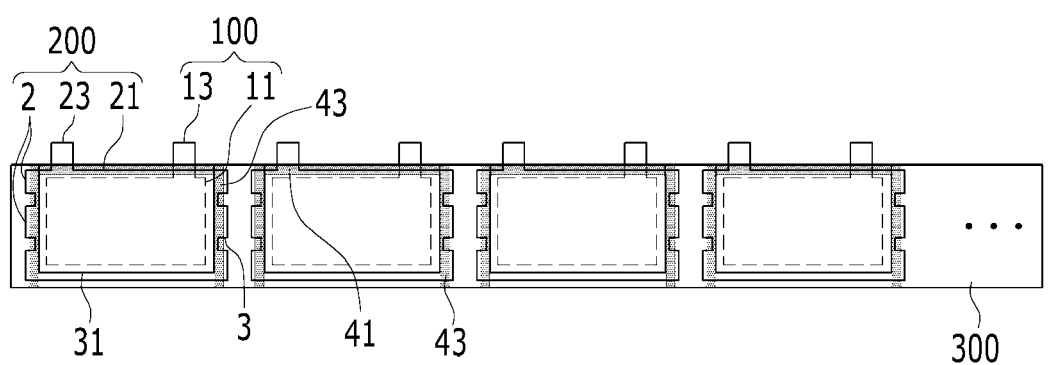

In FIG. 17, the extended electrode portion 2 is illustrated as extending along one side of the second electrode portion 21, but the present invention is not limited thereto. For example, as shown in FIG. 18, a plurality of separate extended electrode portions 2 may be formed in the second electrode portion 21, and a notch 3 may be between the separated extended electrode portions 2.

Figure 19:
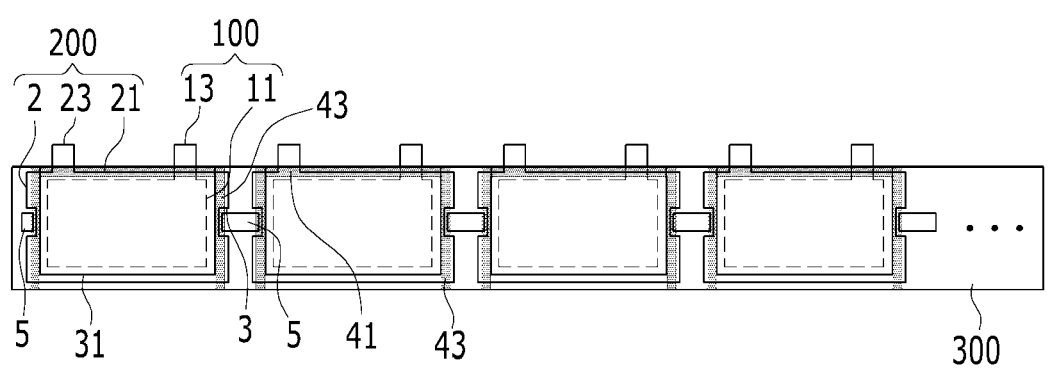

As shown in FIG. 19, the second bonding portion 43 may include a cutout 5 corresponding to the notch 3. As such, when the cutout 5 is formed corresponding to the notch 3, the separation membrane 300 may be more easily folded. The separation membrane 300 is folded at the second bonding portion 43, and in this embodiment, an area of the second bonding portion 43 decreases by the area of the cutout 5 such that the bending stress at the second bonding portion 43 decreases, thereby allowing the separation membrane 300 to be easily folded.

Figure 20:
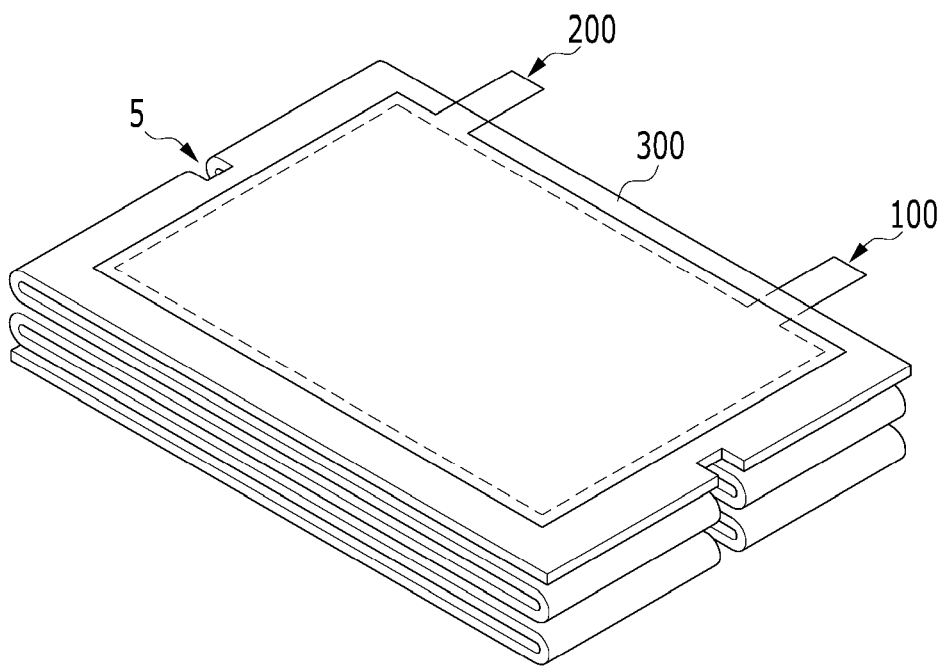

As shown in FIG. 19, the cutout 5 may be formed before the separation membrane 300 is folded, but the present invention is not limited thereto. As shown in FIG. 20, the cutout 5 may be formed after repeatedly folding the separation membrane 300 to form the electrode assembly. In such an embodiment, a border of the cutout 5 is positioned within a border of the notch 3, and the border of the cutout 5 is spaced from (e.g., is spaced apart from) the border of the notch 3.

As such, when the cutout 5 is formed within the border of the notch 3, it is possible to strongly fix the first electrode portion 11 while reducing or minimizing a size of the second bonding portion 43 surrounding the notch 3.

Hereinafter, a manufacturing method of the electrode assembly according to an exemplary embodiment of the present invention will be described in detail with reference to the accompanying drawings.

FIGS. 21-24 are schematic views illustrating a manufacturing method of an electrode assembly according to an exemplary embodiment of the present invention.

Figure 21:
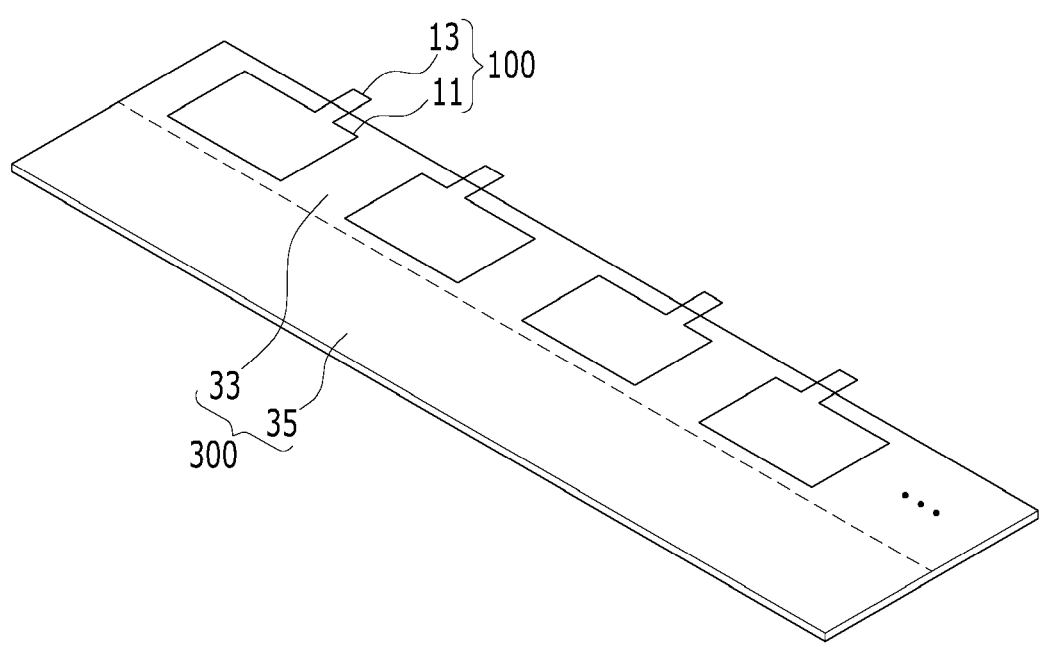
FIGS. 21-24 are schematic views illustrating a manufacturing method of an electrode assembly according to an exemplary embodiment of the present invention.

As shown in FIG. 21, the first electrode 100, the second electrode 200, and the separation membrane 300 are prepared. The separation membrane 300 includes the first member 33 and the second member 35. The first member 33 and the second member 35 may be integrally connected to each other (or integrally formed).

Next, the first electrodes 100 are disposed at intervals (e.g., at predetermined intervals) on the first member 33. In such an embodiment, because the first electrode portions 11 are disposed at intervals on the first member 33, a portion of the first member 33 between the adjacent first electrode portions 11 is exposed. The first uncoated region 13 is disposed to protrude outside of a border of the separation membrane 300.

Figure 22:
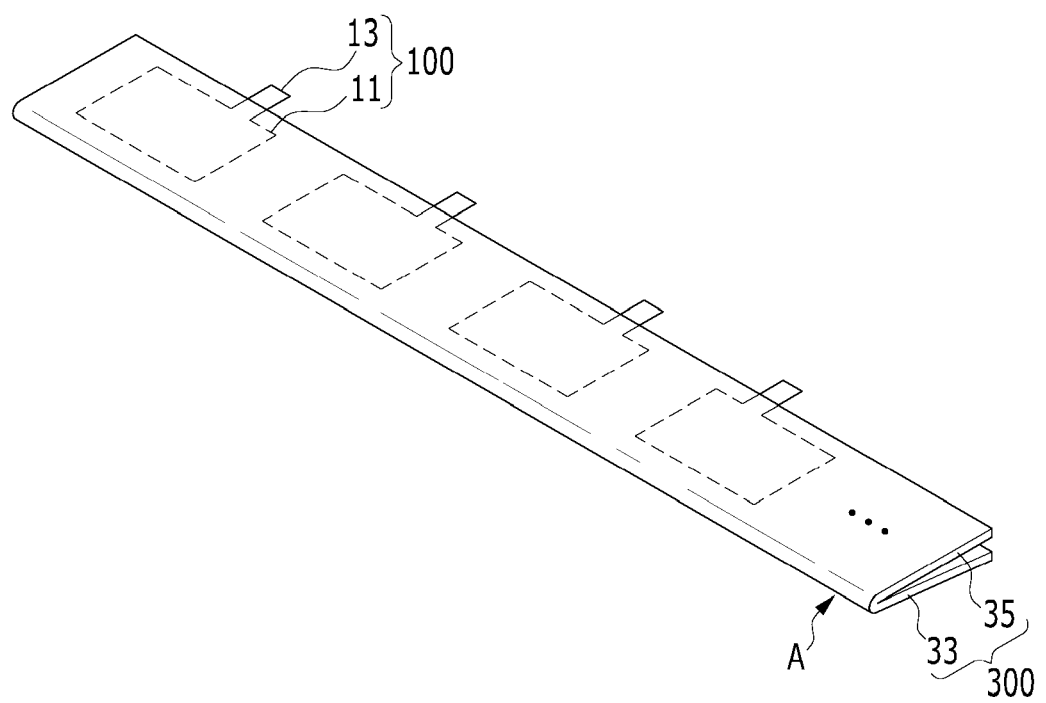

Next, as shown in FIG. 22, the separation membrane 300 is folded so that the first electrode portion 11 is covered (e.g., the second member 35 is folded over the first electrode portion 11). In some embodiments, the second member 35 is folded along a folding line (A) such that an exposed portion of the first member 33 that does not overlap the first electrode portion 11 and a portion of the second member 35 of the separation membrane 300 directly contact each other. The folding line (A) may extend along an opposite side of the first electrode portion 11.

Figure 23:
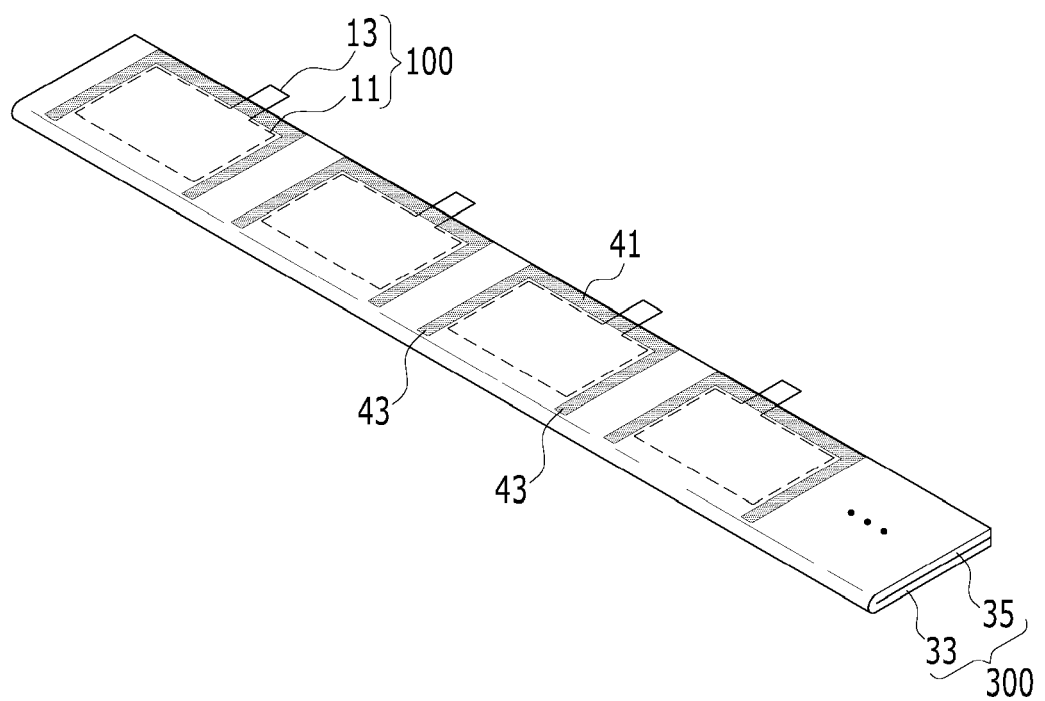

Next, as shown in FIG. 23, the first bonding portion 41 and the second bonding portion 43 are formed by bonding portions of the first member 33 and the second member 35 at where they directly contact each other. In embodiments in which the separation membrane 300 includes the integral first member 33 and second member 35, the third bonding portion 45 may be omitted. The bonding portions may be formed by thermal bonding using heat generated by a laser or heater, friction welding, such as ultrasonic or high-frequency welding, or an adhesive.

As such, when the first bonding portion 41 and the second bonding portion 43 are formed, a plurality of the first electrodes 100 may be fixed to the separation membrane 300 and a subsequent process may be easily performed.

Figure 24:
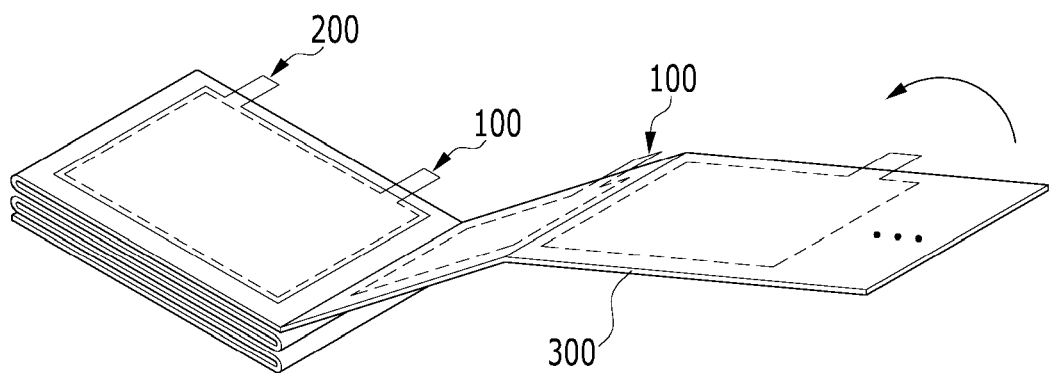

Next, as shown in FIG. 24, the first electrode portion 11 of the first electrode 100 and the second electrode 200 are disposed to overlap each other with the separation membrane 300 therebetween. Because the first electrode 100 is fixed to the separation membrane 300, the second electrode 200 may be easily aligned on (or aligned with respect to) the first electrode 100.

Then, the separation membrane 300 is folded to overlap the second electrode 200. In some embodiments, the first electrode portions 11 included in the separation membrane 300 are folded to overlap the second electrode portions 21.

When the separation membrane 300 is repeatedly folded, a process in which the second electrode 200 is disposed and folded is repeatedly performed because the second electrode 200 that is not fixed to the separation membrane 300 may be unintentionally separated from the separation membrane 300. In such embodiments, the folding direction may alternative (e.g., may alternate such that the separation membrane 300 is folded in a zig-zag form).

When the second electrodes 200 are disposed and folded at opposite sides of the first electrode 100 concurrently, it is possible to improve alignment precision and to increase productivity more than when the second electrodes 200 are disposed one by one.

Figure 25:
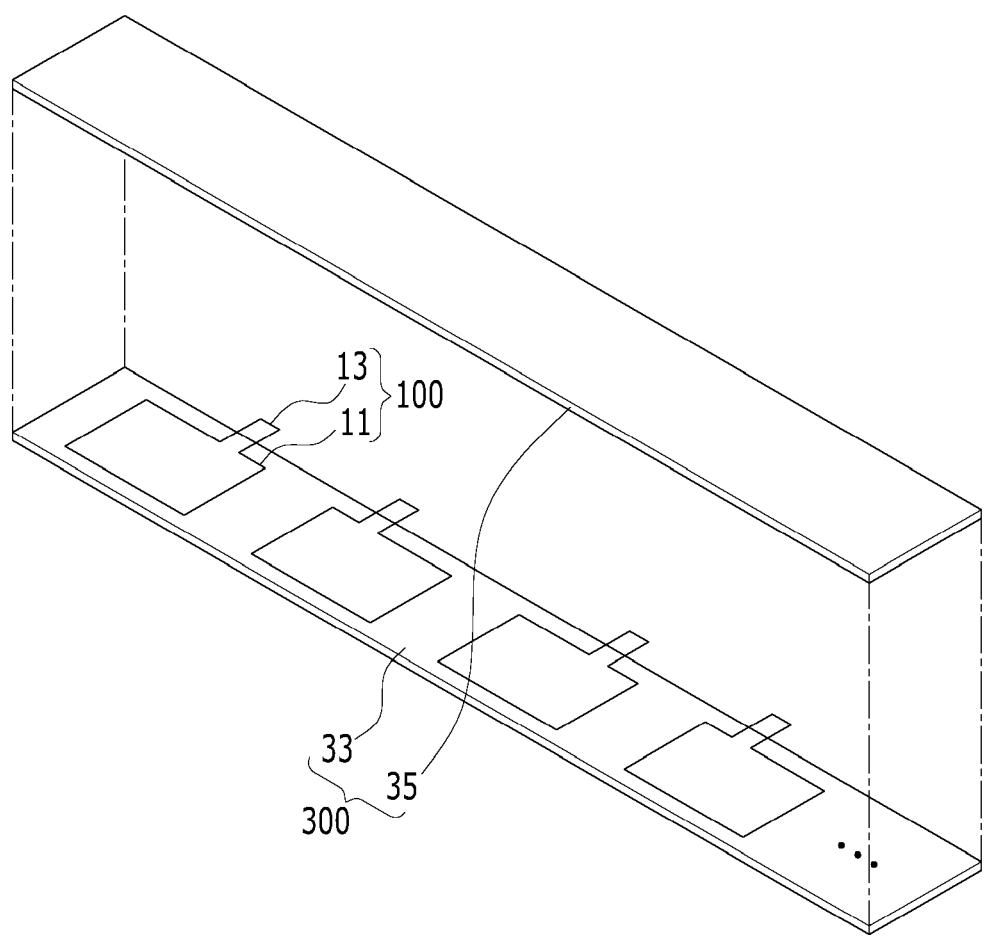
FIGS. 25-27 are schematic views illustrating a manufacturing method of an electrode assembly according to another exemplary embodiment of the present invention.
Figure 26:
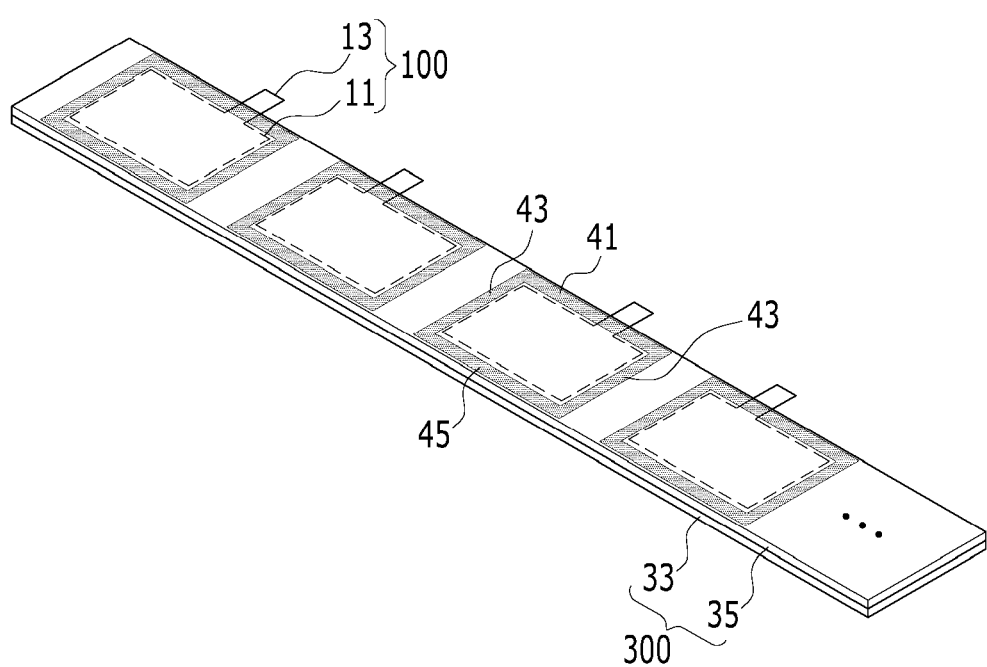
Figure 27:
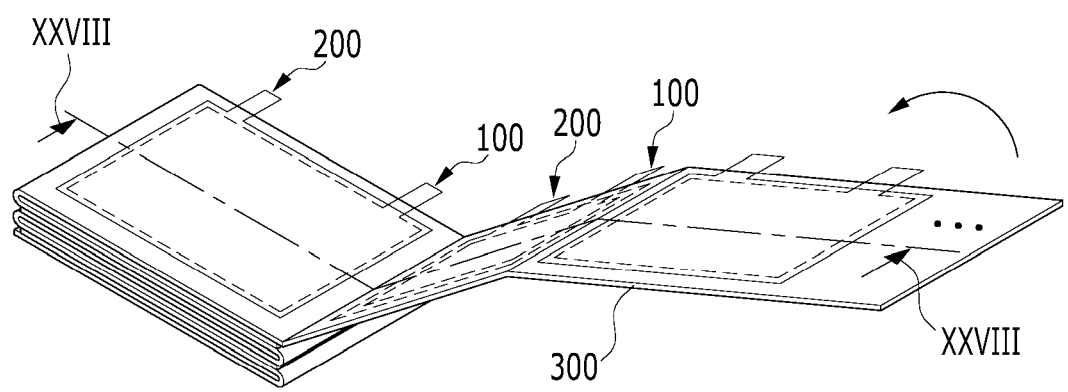
Figure 28:
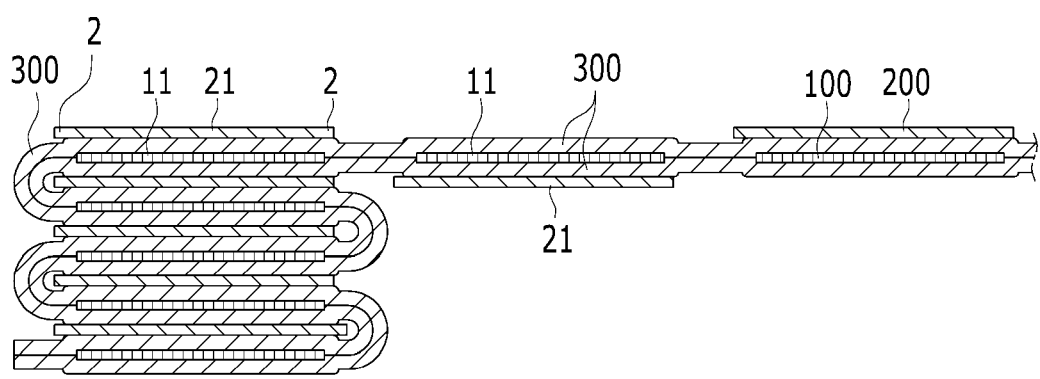
FIG. 28 is a cross-sectional view taken along the line XXVIII-XXVIII of FIG. 27.

FIGS. 25-27 are schematic views illustrating a manufacturing method of an electrode assembly according to another exemplary embodiment of the present invention, and FIG. 28 is a cross-sectional view taken along the line XXVIII-XXVIII of FIG. 27.

As shown in FIG. 25, the first electrode 100, the second electrode 200, and the separation membrane 300 are respectively prepared. The separation membrane 300 includes the first member 33 and the second member 35. The first member and the second member 35 are separate and have the same or substantially the same size.

Next, the first electrodes 100 are disposed at intervals (e.g., at predetermined intervals) on the first member 33. In this embodiment, because the first electrodes 100 are disposed at intervals on the first member, portions of the first member 33 between adjacent ones of the first electrode portions 11 are exposed, and the first uncoated region 13 is disposed to protrude outside of a border of (e.g., outside of a periphery of) the separation membrane 300.

Then, the second member 35 is aligned over the first member 33.

Next, as shown in FIG. 26, the first member 33 and the second member 35 are arranged to overlap so that the exposed portion of the first member 33 that does not overlap the first electrode portion 11 and the second member 35 directly contact each other.

Then, the first bonding portion 41, the second bonding portion 43, and the third bonding portion 45 are formed by thermal-bonding portions of the first member 33 and the second member 35 at where they directly contact each other. Because the first member 33 and the second member 35 are separate, the first bonding portion 41, the second bonding portion 43, and the third bonding portion 45 are, in some embodiments, formed to surround the first electrode portion 11 (e.g., formed to surround a periphery of the first electrode portion 11) such that the first electrode 100 is fixed.

Next, as shown in FIGS. 27 and 28, the first electrode portion 11 of the first electrode 100 and the second electrode 200 are disposed to overlap each other with the separation membrane 300 therebetween. Because the first electrode 100 is fixed to the separation membrane 300, the second electrode 200 may be easily aligned with respect to the first electrode 100. In addition, when the second electrode 200 has the extended electrode portion 2, the second electrode 200 may not be separated and may not be abnormally aligned during a subsequent process. In this embodiment, the extended electrode portion 2 may be attached to the separation membrane 300 by thermal-bonding, in which some of the separation membrane 300 is melted, or by an adhesive.

According to exemplary embodiments of the present invention, the plurality of electrodes are arranged on the spread and extended separation membrane (e.g., on the unfolded separation membrane) at intervals, the separation membrane is folded to overlap the electrodes, and then the separation membrane is bonded to itself along an edge of each of the electrodes, thereby improving safety of the rechargeable battery by reducing a possibility of a counter electrode (e.g., an opposite electrode), added in a subsequent process, contacting one of the electrodes.

In addition, the arranged electrodes are received in the separation membrane, and the separation membrane around the electrodes is bonded only to itself. Thus, the electrodes may be positioned to be tightly fixed, and the electrolyte solution may freely and smoothly flow.

As such, when the electrode assembly is formed through a process in which the counter electrodes are sequentially and alternately disposed or bonded at the outside of the separation membrane which is then folded in a zigzag form (or a folding screen form) after the electrodes are sealed or fixed in the separation membrane, it is possible to improve safety of the rechargeable battery and impregnation of the electrolyte solution. Further, because a plurality of electrodes are simultaneously (or concurrently) arrayed, sealed, and folded, it is possible to improve productivity.

Further, because the electrodes are positioned to be fixed without heating and/or thermal-bonding a surface of the electrode and a surface of the separation membrane to each other, the electrolyte solution may easily and uniformly reach the surface of the electrode, thereby stably improving the quality of the rechargeable battery.

In addition, in embodiments of the present invention, when the rechargeable battery is manufactured after one electrode (e.g., a positive electrode) is wrapped with the separation membrane and then fixed, even though the separation membrane tends to shrink due to heat generated during a repeated charging and discharging process, electrodes having different polarities (e.g., positive and negative electrodes) may not directly contact each other due to the separation membrane therebetween, thereby improving safety of the rechargeable battery.

The aforementioned electrode assembly, according to embodiments of the present invention, may be used as an electrode assembly of a rechargeable battery. Hereinafter, a rechargeable battery including the aforementioned electrode assembly will be further described with reference to the accompanying drawings.

Figure 29:
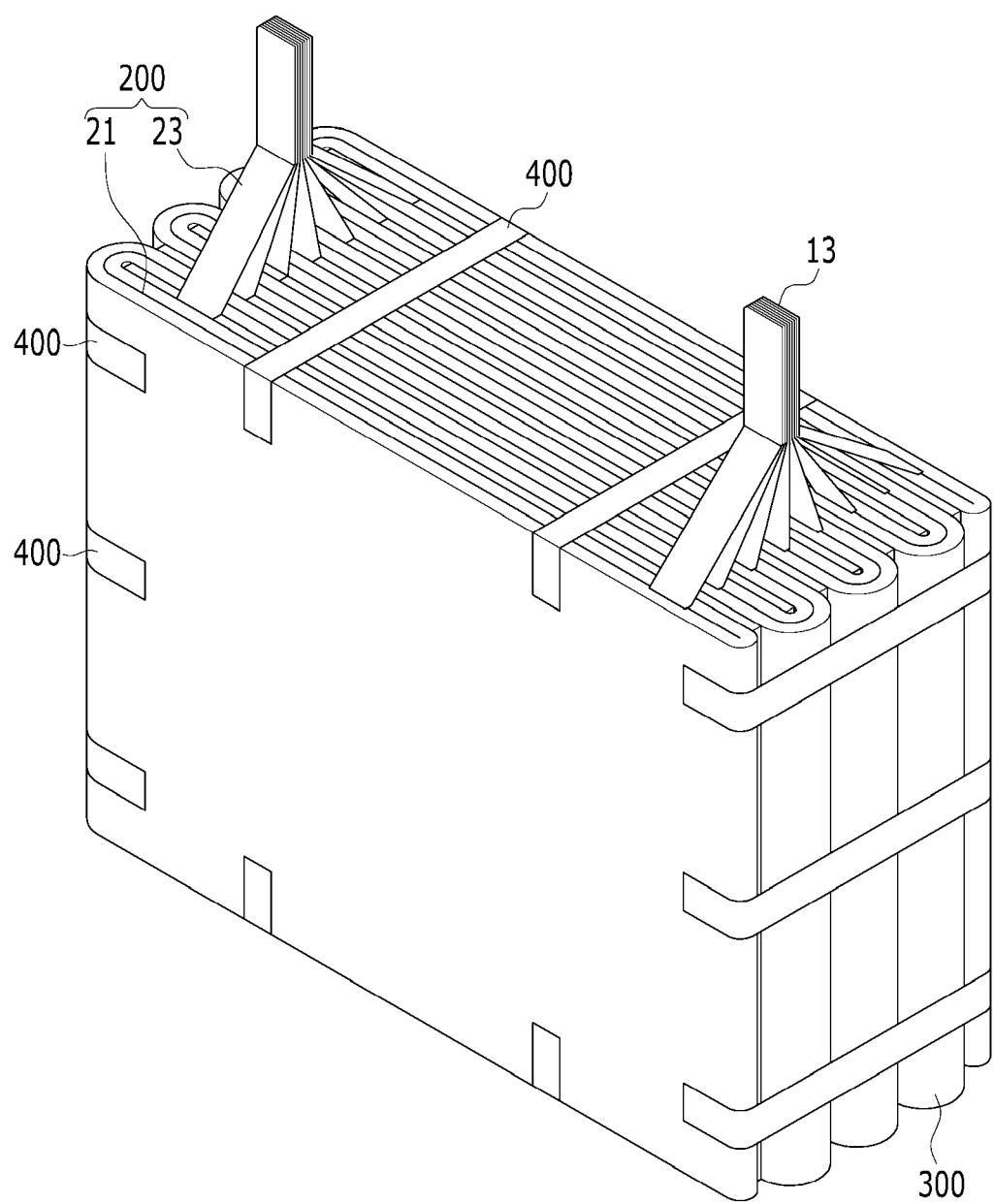
FIG. 29 is a perspective view of an electrode assembly of a rechargeable battery according to an exemplary embodiment of the present invention.
Figure 30:
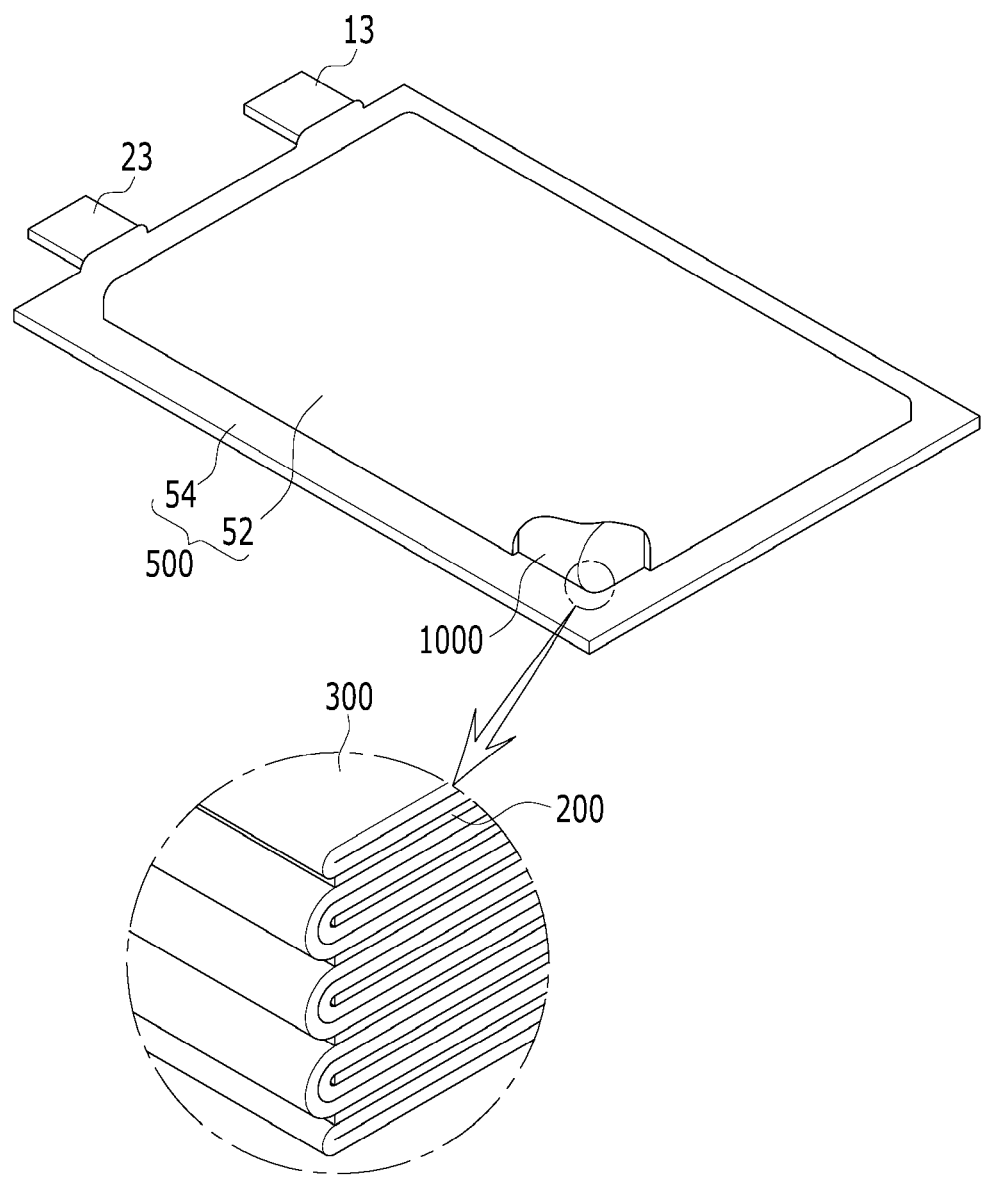
FIG. 30 is a schematic perspective view of a pouch-type rechargeable battery including the electrode assembly shown in FIG. 29.

FIG. 29 is a perspective view of an electrode assembly of a rechargeable battery according to an exemplary embodiment of the present invention, and FIG. 30 is a schematic perspective view of a pouch-type rechargeable battery including the electrode assembly shown in FIG. 29.

As shown in FIGS. 29 and 30, a rechargeable battery according to an exemplary embodiment of the present invention includes the electrode assembly 1000 and a case accommodating the electrode assembly 1000. The case may be a square case (e.g., a can-type case) or a pouch-type case 500, and the pouch-type case 500 will now be exemplarily described.

The electrode assembly 1000 may correspond to the electrode assembly shown in FIG. 1. In such an embodiment, a plurality of first uncoated regions 13 having the same polarity and a plurality of second uncoated regions 23 having the same polarity respectively overlap each other and may be welded to each other by ultrasonic welding and the like.

The electrode assembly 1000 is formed by repeatedly folding the separation membrane 300, and the folded separation membrane 300 may be fixed by a fixing member 400, thereby fixing the folded separation member 300. The fixing member 400 may have a strip shape extending across an edge of the electrode assembly 1000 or entirely surrounding a periphery of the electrode assembly 1000.

The electrode assembly 1000 is inserted into the pouch together with an electrolyte solution, which may then be sealed. The electrolyte solution may include an organic solvent, such as EC, PC, DEC, EMC, and EMC and a lithium salt, such as $LiPF_6$ and $LiBF_4$. The electrolyte solution may be liquid, solid, or gel.

The pouch-type case 500 may have a multi-layered sheet structure. For example, the pouch includes an inner polymer sheet that insulates and provides thermo-bonding functions, an outer PET (polyethylene terephthalate) sheet that acts to protect the electrode assembly 1000, a nylon sheet or a PET-nylon composite sheet, and a metal sheet that provides mechanical strength. The metal sheet may be, for example, an aluminum sheet, and is interposed between the polymer sheet and the nylon sheet.

The pouch-type case 500 has a receiving portion 52 into which the electrode assembly 1000 is inserted and has an edge portion 54 at where the pouch is bonded by thermal-bonding to be sealed.

While the present invention has been described in connection with what is presently considered to be practical exemplary embodiments, it is to be understood that the present invention is not limited to the disclosed embodiments and is intended to cover various modifications and equivalent arrangements included within the spirit and scope of the appended claims and their equivalents.

<Description of Some Reference Symbols>

| | |
|---|---|
| 2: extended electrode portion | 3: notch |
| 5: cutout | 11: first electrode portion |
| 13: first uncoated region | 21: second electrode portion |
| 23: second uncoated region | 31, 52: receiving portion |
| 33: first member | 35: second member |
| 54: edge portion | 100: first electrode |
| 200: second electrode | 300: separation membrane |
| 400: fixing member | 500: pouch |
| 1000: electrode assembly | |

What is claimed is:

1. An electrode assembly comprising:
a plurality of first electrodes, each comprising a first electrode portion having a first active material layer thereon and a first uncoated region electrically connected to the first electrode portion;
a separation membrane comprising a plurality of receiving portions arranged at intervals and respectively accommodating the first electrode portions, the separation membrane being folded so that surfaces of adjacent ones of the receiving portions face each other; and
a plurality of second electrodes respectively positioned between directly adjacent ones of the receiving portions that face each other to overlap a corresponding one of the first electrode portions, the plurality of second electrodes each comprising a second electrode portion having a second active material layer thereon and a second uncoated region electrically connected to the second electrode portion,
wherein the separation membrane further comprises a first bonding portion at an edge of one of the receiving portions and sealing one side of the receiving portion,
wherein the first uncoated region of the first electrode accommodated in the one of the receiving portions extends through the first bonding portion to protrude outside of the receiving portion,
wherein the separation membrane further comprises a plurality of second bonding portions, the second bonding portions respectively connected to opposite ends of the first bonding portion,
wherein the second bonding portions are at opposite edges of the one of the receiving portions and extend in a direction crossing the first bonding portion,
wherein the second electrode portions each comprise an extended electrode portion protruding outside of a periphery of the first electrode portion, and
wherein the extended electrode portion has a notch that is concave toward the first electrode portion.

2. The electrode assembly of claim 1, wherein the separation membrane further comprises a third bonding portion extending in a direction parallel to the first bonding portion, and
wherein the first bonding portion and the third bonding portion are at opposite edges of the one of the first electrode portions accommodated in the one receiving portion.

3. The electrode assembly of claim 2, wherein at least one of the first bonding portion and the third bonding portion is formed in plural.

4. The electrode assembly of claim 2, wherein the first bonding portion, the second bonding portions, and the third bonding portion surround a periphery of the one of the first electrode portions.

5. The electrode assembly of claim 1, wherein one surface of the extended electrode portion is bonded to the second bonding portion.

6. The electrode assembly of claim 5, wherein the second bonding portion has a cutout corresponding to the notch.

7. The electrode assembly of claim 1, wherein the separation membrane further comprises a fourth bonding portion between adjacent ones of the receiving portions.

8. The electrode assembly of claim 7, wherein the separation membrane further comprises a fifth bonding portion at an edge of one of the receiving portions overlapping the first uncoated region.

9. The electrode assembly of claim 8, wherein the separation membrane further comprises a sixth bonding portion extending in a direction parallel to the fifth bonding portion, and
wherein the fifth bonding portion and the sixth bonding portion are positioned at opposite sides of one of the first electrode portions in the one of the receiving portions.

10. The electrode assembly of claim 9, wherein at least one of the fourth bonding portion, the fifth bonding portion, and the sixth bonding portion is formed in plural.

11. The electrode assembly of claim 9, wherein the fourth bonding portion, the fifth bonding portion, and the sixth bonding portion surround a periphery of one of the first electrode portions in the one of the receiving portions.

12. The electrode assembly of claim 1, wherein the first electrodes and the second electrodes are alternately stacked.

13. The electrode assembly of claim 1, wherein at least three edges of the receiving portions are closed.

14. The electrode assembly of claim 1, wherein the separation membrane comprises a first member and a second member that respectively overlap opposite surfaces of the first electrode portions with the first electrode portions therebetween, and
wherein the first member and the second member are bonded to each other along a periphery of each of the first electrode portions.

15. The electrode assembly of claim 14, wherein the first electrodes are a positive electrodes, and the second electrodes are negative electrodes.

16. The electrode assembly of claim 15, wherein the second electrode portions are larger than the first electrode portions.

17. The electrode assembly of claim 1, wherein the second electrodes have two parallel first edges and two parallel second sides, the first sides extending perpendicularly to the second sides,
wherein the second uncoated region is at one of the first edges, and
wherein at least one of first edges or the second edges is exposed by the separation membrane.

* * * * *